US009584917B2

(12) United States Patent
Menke et al.

(10) Patent No.: US 9,584,917 B2
(45) Date of Patent: Feb. 28, 2017

(54) MICROPHONE UNIT, POCKET TRANSMITTER AND WIRELESS AUDIO SYSTEM

(75) Inventors: Claus Menke, Schneverdingen (DE); Sven Boetcher, Wedemark (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 332 days.

(21) Appl. No.: 13/390,978

(22) PCT Filed: Aug. 18, 2010

(86) PCT No.: PCT/EP2010/062033
§ 371 (c)(1),
(2), (4) Date: Mar. 29, 2012

(87) PCT Pub. No.: WO2011/020850
PCT Pub. Date: Feb. 24, 2011

(65) Prior Publication Data
US 2012/0189137 A1 Jul. 26, 2012

(30) Foreign Application Priority Data
Aug. 18, 2009 (DE) ........................ 10 2009 037 687

(51) Int. Cl.
*H04B 3/00* (2006.01)
*H04R 5/04* (2006.01)
*G10L 21/00* (2013.01)
*H04R 1/10* (2006.01)

(52) U.S. Cl.
CPC ................ *H04R 5/04* (2013.01); *G10L 21/00* (2013.01); *H04R 1/1091* (2013.01); *H04R 2410/00* (2013.01); *H04R 2460/07* (2013.01)

(58) Field of Classification Search
CPC .... H04R 5/04; H04R 1/1091; H04R 2410/00; H04R 2460/07
USPC ...................... 381/56, 91–92, 77, 79; 700/94
See application file for complete search history.

(56) References Cited

U.S. PATENT DOCUMENTS

2003/0040326 A1 2/2003 Levy et al.
2006/0193477 A1* 8/2006 Zehnle .................. H03G 5/005 381/61
2009/0307594 A1* 12/2009 Kosonen ............. G10H 1/0008 715/727
2010/0142725 A1* 6/2010 Goldstein ............... G10L 19/00 381/92

(Continued)

FOREIGN PATENT DOCUMENTS

DE 100 61 782 6/2002
DE 102 47 152 4/2004

(Continued)

OTHER PUBLICATIONS

International Search Report for Application No. PCT/EP2010/062033 dated Dec. 1, 2010.

*Primary Examiner* — Disler Paul
(74) *Attorney, Agent, or Firm* — Frommer Lawrence & Haug LLP

(57) ABSTRACT

There is provided a microphone unit for recording audio signals comprising an audio processing unit for processing the recorded audio signals, a detection unit for detecting metadata belonging to the audio signal, and a first transmitting and receiving unit for transmitting the processed audio signal and the metadata.

9 Claims, 2 Drawing Sheets

(56) References Cited

U.S. PATENT DOCUMENTS

| | | | | |
|---|---|---|---|---|
| 2010/0316232 | A1* | 12/2010 | Acero .................... | H04R 27/00<br>381/92 |
| 2012/0271617 | A1* | 10/2012 | Nakajima et al. ................ | 704/2 |

FOREIGN PATENT DOCUMENTS

| | | |
|---|---|---|
| DE | 10 2004 054 940 | 11/2004 |
| DE | 20 2004 010 933 | 11/2005 |
| EP | 1 959 662 | 8/2008 |
| WO | WO 2006/084841 | 8/2006 |
| WO | WO 2007/028628 | 3/2007 |
| WO | WO 2009/003548 | 1/2009 |

* cited by examiner

MICROPHONE UNIT, POCKET TRANSMITTER AND WIRELESS AUDIO SYSTEM

The present application claims priority from PCT Patent Application No. PCT/EP2010/062033 filed on Aug. 18, 2010, which claims priority from German Patent Application No. DE 10 2009 037 687.9 filed on Aug. 18, 2009, the disclosures of which are incorporated herein by reference in their entirety.

BACKGROUND OF THE INVENTION

1. Field of the Invention

The present invention concerns a microphone unit, a pocket transmitter and a wireless audio system.

2. Description of Related Art

If a microphone or for example a pocket transmitter is used by different people, then typically the settings at the microphone unit and the pocket transmitter have to be implemented manually for example by a sound engineer.

As general technological background attention is directed to DE 10 2004 054 940 A1, DE 102 47 152 A1, DE 100 61 782 A1, EP 1 959 662 A1 and WO 2009/003548 A1.

SUMMARY OF THE INVENTION

The object of the present invention is to provide a microphone unit and a pocket transmitter which is more flexible and easier to use.

Thus there is provided a microphone unit for recording audio signals comprising an audio processing unit for processing the recorded audio signals, a detection unit for detecting metadata belonging to the audio signal, and a first transmitting unit for transmitting the processed audio signal and/or the metadata. Thus both the audio signals and also the metadata can be transmitted together. That can be achieved for example by the metadata being transmitted embedded in the audio signals.

In an aspect of the invention the microphone unit has an embedding unit for embedding metadata in the audio signal. The metadata can have an identification of an identification unit in the environment of the microphone unit and/or positional information of the microphone unit.

The invention concerns the idea of providing a microphone unit and a pocket transmitter. A user of the microphone unit or the pocket transmitter carries about his person a possible form of identification such as for example a chip card. The microphone unit and the pocket transmitter can identify the chip card or the identification stored thereon. The chip card or another storage option can be used to store user-specific settings. When the storage unit is introduced into the microphone unit or the pocket transmitter those user-specific settings can be transmitted to the microphone unit or the pocket transmitter. The microphone unit or the pocket transmitter can then be suitably set or personalized on the basis of the user-specific settings. As an alternative to a storage unit such as for example a chip card which has to be inserted into the microphone unit or the pocket transmitter, wireless identification and/or transmission of the items of information can also be effected. That can be transmitted for example by an RFID tag, by a Bluetooth protocol, a WLAN protocol or other wireless protocols. The items of information in respect of the user can be transmitted as metadata together with the recorded audio signals wirelessly or in wired fashion.

Optionally the microphone unit or the pocket transmitter can be wirelessly or wired coupled to an external receiving unit. The microphone unit or the pocket transmitter can then pass the items of information in respect of the user to the receiving unit which then accesses a database in which previously stored settings and parameters of the microphone unit and the pocket transmitter are stored. Those items of information can optionally then be transmitted from the receiving unit to the microphone unit or the pocket transmitter so that the adjustable parameters and settings of the microphone unit and the pocket transmitter can be set on the basis of the information from the database. In that way the microphone unit and the pocket transmitter can be set to the needs of the user.

The audio signal can also be later evaluated based on the metadata, by the addition of metadata to the audio signal.

Further configurations of the invention are subject-matter of the appendant claims.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
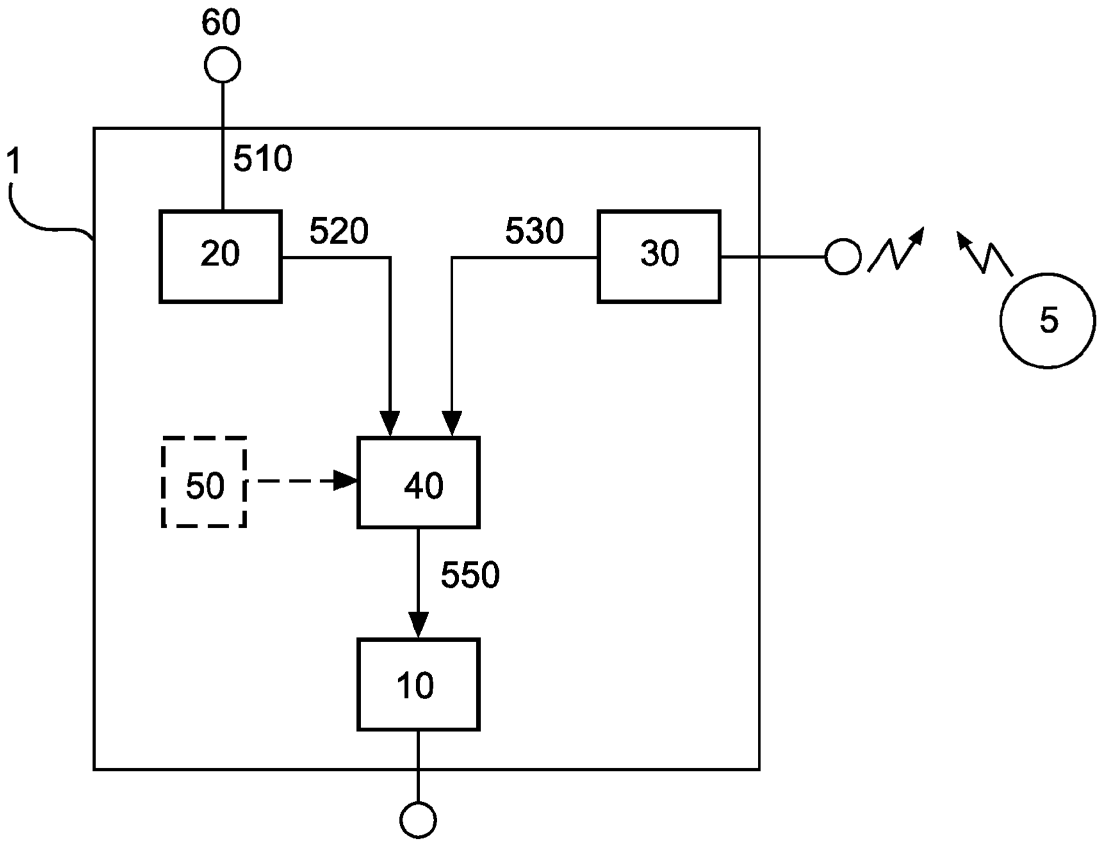
FIG. 1 shows a block circuit diagram of a microphone unit or a pocket transmitter according to a first embodiment.

FIG. 1 shows a block circuit diagram of a microphone unit or a pocket transmitter according to a first embodiment. The microphone unit or the pocket transmitter according to the first embodiment can be both wirelessly and also wired coupled to an external receiving unit. The microphone unit or the pocket transmitter can for example pass audio signals recorded by a microphone capsule (not shown) together with metadata (positional information and/or user information) to the receiving unit.

The microphone unit or the pocket transmitter according to the first embodiment has a transmitting and receiving unit 10, an audio processing unit 20, a metadata detection unit 30 and a metadata embedding unit 40. Optionally the microphone unit or the pocket transmitter can have a position determining unit 50.

The metadata detection unit 30 can be in the form of an identification detection unit for the detection of an identification for example of a chip card 5 in the environment of the microphone unit. The position determining unit 50 can be part of the metadata detection unit.

The audio processing unit 20 is connected to an input 60 and receives for example audio signals 510 recorded by a microphone capsule.

Those audio signals can be processed in the audio processing unit 20. The output signal 520 from the audio processing unit 20 is passed to the metadata embedding unit 40. The identification detection unit 30 detects the identifications for example of chip cards 5 or other storage units in the environment of the microphone unit or the pocket transmitter. The detected identification 530 is outputted to the embedding unit 40. Optionally the positional information 540 of the position determining unit 50 can also be outputted to the embedding unit 40. The embedding unit 40 can embed the identification information 530 and/or optionally the positional information 540 into the processed audio signals 520, for example in the form of a watermark. The audio signal with the embedded metadata 550 is outputted by the embedding unit 40 to the transmitting and receiving unit 10. The transmitting and receiving unit 10 can output the audio signal with the embedded metadata to the output 70.

From the output 70, there can be a wired or wireless transmission to an external receiving unit.

The identification detection unit 30 detects the identification 530 of chip cards 5 preferably wirelessly. The optional position determining unit 50 can preferably wirelessly perform the position detection operation for example on the basis of a GPS signal.

Figure 2:
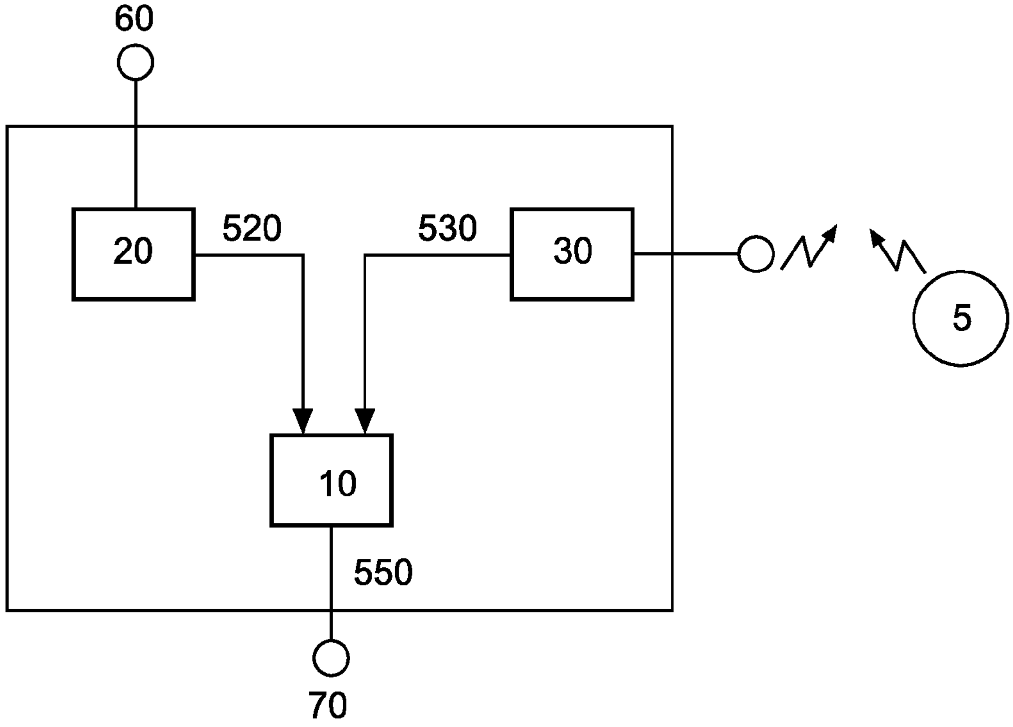
FIG. 2 shows a block circuit diagram of a microphone unit or a pocket transmitter according to a second embodiment.

FIG. 2 shows a block circuit diagram of a microphone unit or a pocket transmitter according to a second embodiment. The configuration of the microphone unit or the pocket transmitter according to the second embodiment substantially corresponds to that of the first embodiment, but there is no embedding unit 40 and the optional position determining unit 50 is coupled to the transmitting and receiving unit 10. In addition the audio processing unit 20 and the identification detection unit 30 are coupled to the transmitting and receiving unit 10. Thus the transmitting and receiving unit 10 transmits both the processed audio signals 520 and also the metadata relating to the audio signal (identification information 530 and/or positional information 520) by way of the output 70. Once again that can be effected in wired or wireless fashion.

While in the first embodiment the metadata are already embedded in the audio signals in the microphone unit or the pocket transmitter the metadata in the second embodiment are only embedded into the audio data in an external receiving unit.

Figure 3:
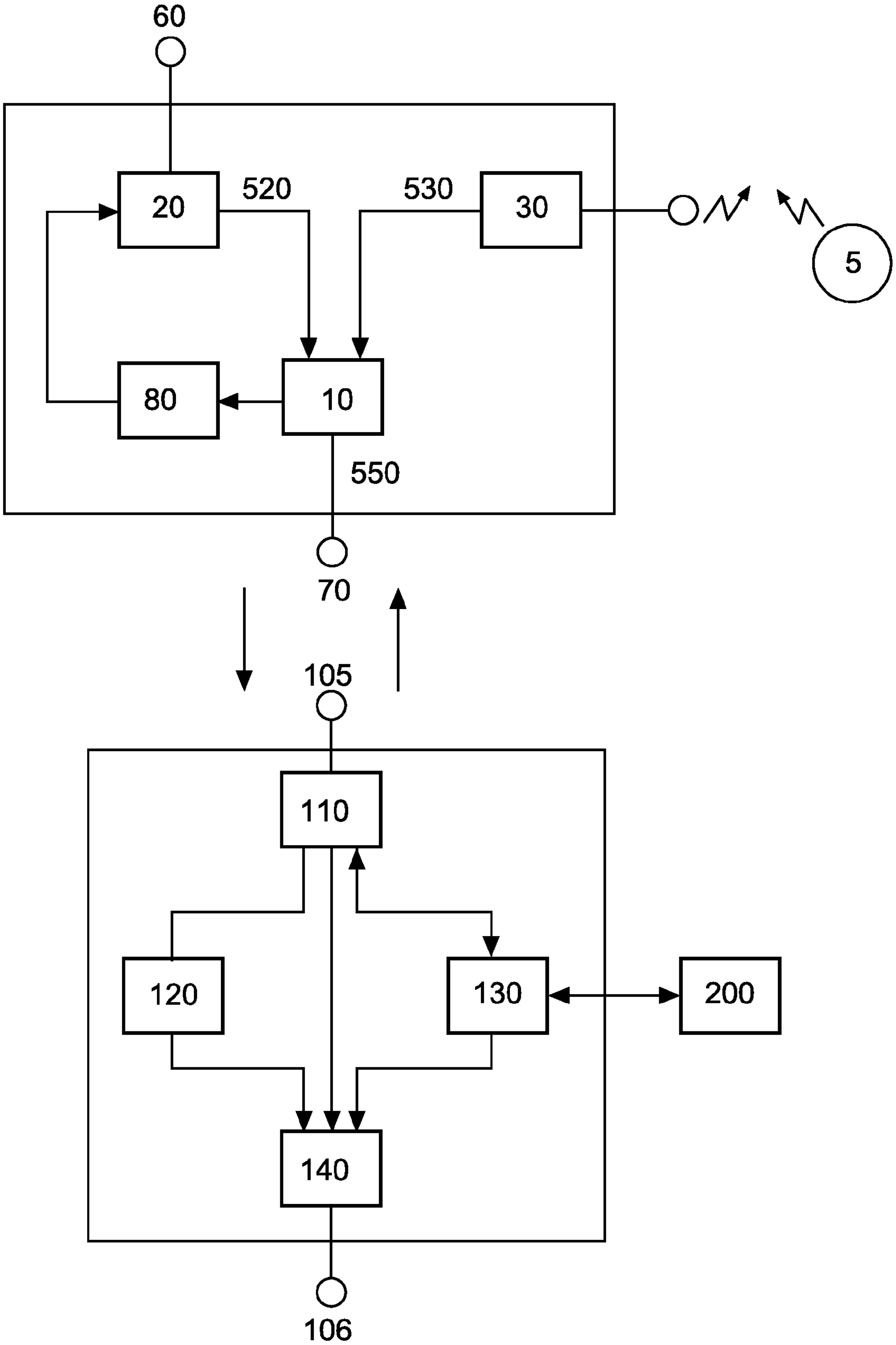
FIG. 3 shows a block circuit diagram of an audio system according to a third embodiment.

FIG. 3 shows a block circuit diagram of an audio system according to a third embodiment. The audio system has at least one microphone unit or a pocket transmitter and a receiver. Communication between the microphone unit or the pocket transmitter and the receiver can be both wired and also wireless. The microphone unit or the pocket transmitter according to the third embodiment is based on the microphone unit or the pocket transmitter of the second embodiment, wherein the microphone unit or the pocket transmitter has a parameter setting unit 80, the input of which is coupled to the transmitting and receiving unit 10 and the output of which is coupled to the audio processing unit 20. Parameters of audio processing can be set in the audio processing unit 20 by means of the parameter setting unit, that is to say audio processing in the audio processing unit 20 can be adapted.

The microphone unit of the third embodiment thus has a transmitting and receiving unit 10, an audio processing unit 20, an identification detection unit 30, optionally a position determining unit 50 and a parameter setting unit 80. The identification detection unit 30 detects an identification for example of a chip card 5 in the environment of the microphone unit or the pocket transmitter. The identification information 530 is outputted to the transmitting and receiving unit 10. The audio processing unit 20 receives an audio signal 510 at the input 60. That audio signal is processed based on the parameter of the audio processing unit 20, that is set by the parameter setting unit 80, and is outputted in the form of a processed audio signal 520 to the transmitting and receiving unit 10. The transmitting and receiving unit transmits the processed audio signal 520 and metadata having the identification information 530 and/or the positional information 540 to the receiving unit.

The receiving unit has a second transmitting and receiving unit 110, an audio unit 120, an identification processing unit 130 and an embedding unit 140. The second transmitting and receiving unit 110 receives the processed audio signals 520 and the metadata 530, 540 from the microphone unit or the pocket transmitter. The audio data 520 are passed to the audio unit 120. The positional information 540 is passed from the second transmitting and receiving unit 110 to the embedding unit 140. The identification information 530 is passed to the identification processing unit 130 which communicates with an (external) database 200 and reads parameter settings out of the database 200, that are associated with the user information 530. Thus the database has both user information and also associated parameter settings. User-specific parameter settings are thus extracted by means of the database. Those user-specific parameter settings 600 are outputted to the second transmitting and receiving unit 110 by the identification processing unit 130. The second transmitting and receiving unit 110 transmits those parameter settings 610 to the first transmitting and receiving unit 10 in the microphone unit or the pocket transmitter. The first transmitting and receiving unit 10 passes the parameter settings 610 to the parameter setting unit 80. The parameter setting unit 80 is connected to the audio processing unit 20 and can suitably set the parameter settings of the audio processing unit 20. That therefore makes it possible to implement user-specific setting of all audio processing in the microphone unit or the pocket transmitter.

The extracted user-specific parameter settings can also be passed from the identification processing unit 130 into the embedding unit. In the second embedding unit 140 metadata (location information, user information and/or user-specific parameter settings) are embedded in the audio signal, for example in the form of a watermark. In that way it is possible to provide for an association of an audio signal with a user and/or a location of the recording. That is particularly advantageous if a plurality of audio signals are stored in a database and only audio signals of a given user at a given location are to be ascertained.

Thus both geotagging and also identification or ID tagging can be effected by means of the microphone unit and the pocket transmitter of the first, second or third embodiment.

The first and second embedding units are preferably of such a design configuration that they can embed the metadata in sound-neutral relationship in the audio signals in the form of a watermarking method.

In accordance with the invention it is possible to implement automatic setting of the parameters of audio processing in a microphone unit or a pocket transmitter in dependence on user-specific demands. In particular therefore it is possible to provide for automatic association of a user with an audio signal. In addition the user-specific settings are automatically loaded so that the correct and desired settings are always involved.

The identification detection unit preferably serves to detect the identification for example of a chip card 5. An association for example in respect of a name of the user can be effected in the receiving unit in accordance with the third embodiment.

The metadata embedded in the audio signal can be used for example in billing systems. In that case the amount of the subscription can be used for payment and ascertaining licensing fees.

A user or person employing the microphone unit or the pocket transmitter has a unique identification unit for example in the form of a chip card. The identification of the identification unit is preferably stored in the database 200 so that there can be a unique association with a user. In addition a profile of the user is stored in the database. That profile can have for example parameters for audio processing and/or information relating to the user. The receiving unit of the third embodiment can be coupled for example to a subsequent audio processing system such as for example a mixer desk, wherein user information can be automatically displayed at the mixer desk.

A position of the microphone unit can be determined by means of the position determining unit 50 and those items of information can be embedded in the form of metadata in the audio signal. That makes it possible to effect sound-neutral geotagging. The position determining unit 50 can be implemented for example in the form of a GPS chip in an analog-digital converter in the microphone unit.

The above-described principles of the invention can be implemented for example in an analog or digital wireless microphone. In addition the principles of the invention can be implemented for example in a camera receiver with an optional integrated analog-digital converter means, wherein for example a GPS chip is integrated into the analog-digital converter.

The invention also concerns a (camera) receiver having an audio processing unit for processing the recorded audio signals, a detection unit for detecting metadata belonging to the audio signal and a first transmitting unit for transmitting the processed audio signals and/or the metadata.

In accordance with a further embodiment of the invention there is provided an in-ear monitor unit. That embodiment can be based for example on the third embodiment. Thus the in-ear monitor unit can have an identification detection unit and a parameter setting unit. The parameter setting unit serves to set the parameters of the in-ear monitor unit based on the results of the identification detection unit. Thus this can involve personalized setting of the in-ear monitor if for example the user carries an RFID chip about his person.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. An audio system, comprising:

a microphone unit for recording audio signals, the microphone unit having:

an input unit configured to receive recorded audio signals;

a detection unit configured to detect metadata associated with the audio signals; and a first transmitting unit configured to transmit the audio signals and the metadata;

a receiving unit configured to receive the transmitted audio signals and the metadata, said receiving unit comprising an identification processing unit configured to extract user-specific settings from a database based on the detected metadata;

an audio processing unit configured to process the recorded audio signals; and a parameter setting unit configured to set parameters of the audio processing unit;

wherein the set parameters represent user-specific settings extracted from the database; and wherein the metadata includes:

a user identification provided by an identification detection unit, the user identification being specific to an individual user.

2. The audio system according to claim 1, wherein the microphone unit for recording audio signals comprises an embedding unit for embedding the metadata in the audio signals.

3. The audio system according to claim 1, wherein the audio processing unit is arranged in the microphone unit; and wherein the receiving unit comprises a second transmitting unit configured to send the user-specific settings to the microphone unit.

4. The audio system according to claim 2, wherein the audio processing unit is arranged in the microphone unit; and wherein the receiving unit comprises a second transmitting unit configured to send the user-specific settings to the microphone unit.

5. An audio system, comprising:

a microphone unit for recording audio signals, the microphone unit having:

an input unit configured to receive recorded audio signals;

a detection unit configured to detect metadata associated with the audio signals;

a first transmitting unit configured to transmit at least one of the audio signals and the metadata;

an audio processing unit configured to process the recorded audio signals; and a parameter setting unit configured to set parameters of the audio processing unit;

a receiving unit configured to receive the transmitted audio signals and the metadata, said receiving unit comprising:

an identification processing unit configured to extract user-specific settings from a database based on the detected metadata;

a second transmitting and receiving unit configured to receive the audio signals and the metadata and to send user-specific settings to the microphone unit;

wherein the set parameters represent user-specific settings extracted from the database; and wherein the metadata include at least one of:

a user identification provided by an identification detection unit, the user identification being specific to an individual user; and positional information of the microphone unit.

6. An audio system, comprising:

a pocket transmitter, the pocket transmitter having:

an input unit configured to receive recorded audio signals from a microphone capsule;

a detection unit configured to detect metadata associated with the audio signals; and a first transmitting unit configured to transmit the audio signals and the metadata;

a receiving unit configured to receive the transmitted audio signals and the metadata, said receiving unit comprising an identification processing unit configured to extract user-specific settings from a database based on the detected metadata;

an audio processing unit configured to process the recorded audio signals; and a parameter setting unit configured to set parameters of the audio processing unit;

wherein the set parameters represent user-specific settings extracted from the database; and wherein the metadata includes:

a user identification provided by an identification detection, the user identification being specific to an individual user.

7. A microphone unit for recording audio signals comprising:

an input unit configured to receive recorded audio signals;

a detection unit configured to detect metadata associated with the audio signals;

an embedding unit configured to embed the metadata into the audio signals in the form of a watermark; and a transmitting unit configured to transmit the audio signals with the embedded metadata;

wherein the metadata includes:

a user identification provided by an identification detection, the user identification being specific to an individual user.

8. A pocket transmitter comprising:

an input unit configured to receive recorded audio signals from a microphone capsule;

a detection unit configured to detect metadata associated with the audio signals;

an embedding unit configured to embed the metadata into the audio signals in the form of a watermark; and a transmitting unit configured to transmit the audio signals with the embedded metadata;

wherein the metadata includes:

a user identification provided by an identification detection, the user identification being specific to an individual user.

9. A audio system comprising:

a microphone unit as set for in claim 7 or a pocket transmitter as set forth in claim 8; and a receiving unit configured to receive the transmitted audio signals with the embedded metadata;

wherein said receiving unit comprises:

an identification processing unit configured to extract user-specific settings from a database based on the detected metadata;

an audio processing unit configured to process the recorded audio signals; and a parameter setting unit configured to set the parameters of the audio processing unit, wherein the set parameters represent user-specific settings from the database.

* * * * *